(12) United States Patent
Kanemaru

(10) Patent No.: US 10,423,152 B2
(45) Date of Patent: Sep. 24, 2019

(54) INFORMATION PROCESSING APPARATUS FOR PROCESSING MACHINING INFORMATION BETWEEN PLURALITY OF MANUFACTURING CELLS

(71) Applicant: FANUC CORPORATION, Yamanashi (JP)

(72) Inventor: Akira Kanemaru, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 285 days.

(21) Appl. No.: 15/590,206

(22) Filed: May 9, 2017

(65) Prior Publication Data

US 2017/0329315 A1    Nov. 16, 2017

(30) Foreign Application Priority Data

May 16, 2016  (JP) ................................. 2016-098237

(51) Int. Cl.
G05B 19/418  (2006.01)
B23P 23/06   (2006.01)
G06F 16/20   (2019.01)

(52) U.S. Cl.
CPC ........ *G05B 19/41815* (2013.01); *B23P 23/06* (2013.01); *G05B 19/4183* (2013.01);
(Continued)

(58) Field of Classification Search
CPC ........ G05B 19/41815; G05B 19/41855; G05B 19/4183; G05B 19/41845;
(Continued)

(56) References Cited

U.S. PATENT DOCUMENTS 7,275,236 B1 * 9/2007 Kabe .................... G05B 19/056
                                                         717/106
9,031,692 B2   5/2015 Zhu
(Continued)

FOREIGN PATENT DOCUMENTS

JP    H3-164956 A    7/1991
JP    H5-40507 A     2/1993
(Continued)

*Primary Examiner* — Michael Pham
(74) *Attorney, Agent, or Firm* — Hauptman Ham, LLP

(57) ABSTRACT

An information processing apparatus includes a configuration information unit, a data conversion unit, and a common data management unit. On the basis of configuration information of each machine, the configuration information management unit generates a conversion table that associates system common information with dedicated information for each machine that corresponds to the system common information. The data conversion unit converts dedicated data for each machine into common data in accordance with the dedicated information for each machine in the conversion table and converts the common data into the dedicated data for each machine in accordance with the system common information in the conversion table. The common data management unit stores, in a common data storage unit, the common data thus generated and transfers the common data stored in the common data storage unit to the data conversion unit.

3 Claims, 9 Drawing Sheets

(52) U.S. Cl.
CPC . *G05B 19/41845* (2013.01); *G05B 19/41855* (2013.01); *G05B 2219/31088* (2013.01); *G06F 16/20* (2019.01); *Y02P 90/08* (2015.11); *Y02P 90/16* (2015.11); *Y02P 90/18* (2015.11)

(58) Field of Classification Search
CPC ........... G05B 2219/31088; B23P 23/06; Y02P 90/08; Y02P 90/18; Y02P 90/16; G06F 16/20
USPC ............................................ 707/758; 700/96
See application file for complete search history.

(56) References Cited

U.S. PATENT DOCUMENTS

| | | | | |
|---|---|---|---|---|
| 2003/0083754 | A1* | 5/2003 | Tripathi | G05B 15/02 700/2 |
| 2009/0037010 | A1* | 2/2009 | Kawano | G05B 19/408 700/96 |
| 2013/0125232 | A1* | 5/2013 | Hogan | G05B 19/0423 726/19 |

FOREIGN PATENT DOCUMENTS

| | | |
|---|---|---|
| JP | 5-216524 A | 8/1993 |
| JP | H8-202427 A | 8/1996 |
| JP | 9-305213 A | 11/1997 |
| JP | 2000-194409 A | 7/2000 |
| JP | 2003-243900 A | 8/2003 |
| JP | 2010-224939 A | 10/2010 |
| JP | 2013-134786 A | 7/2013 |

* cited by examiner

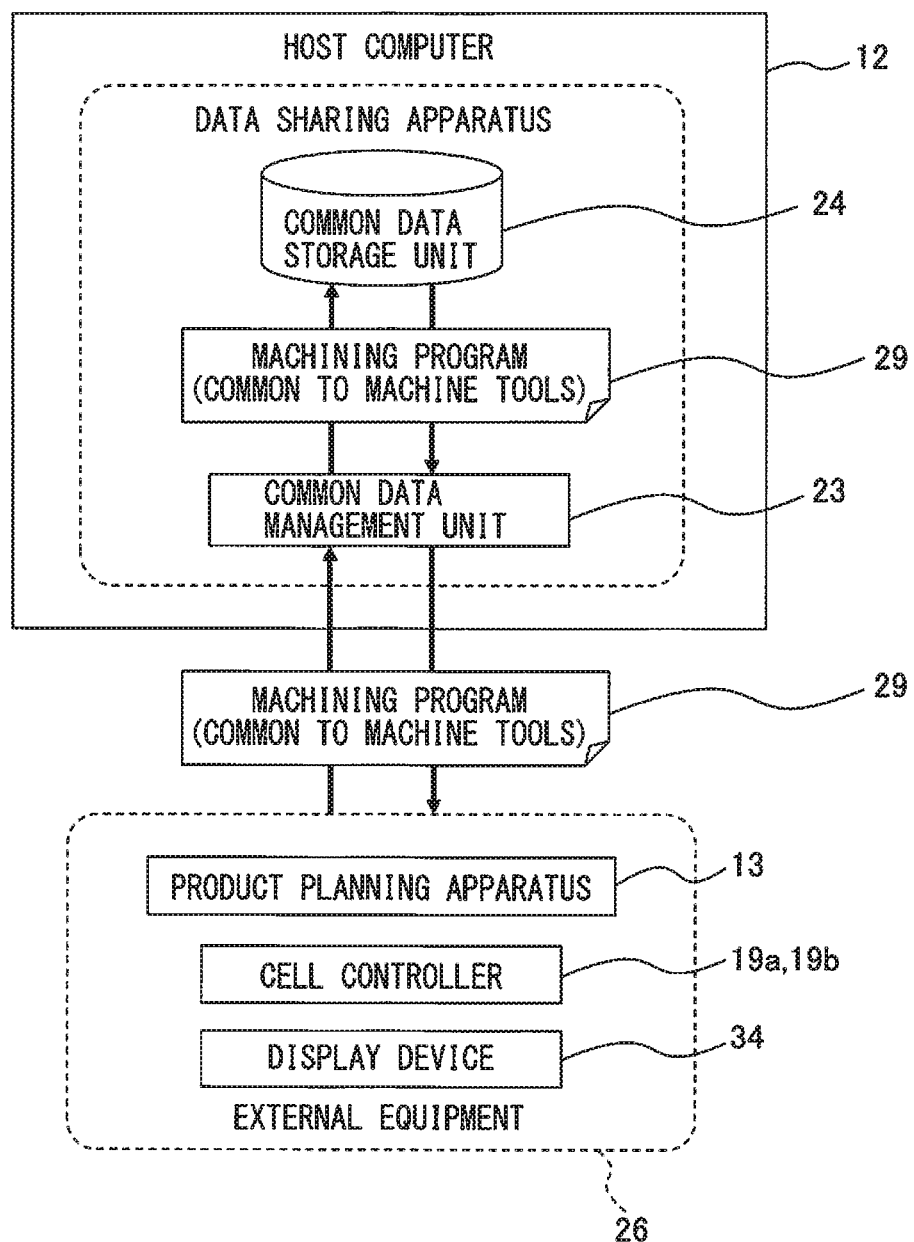

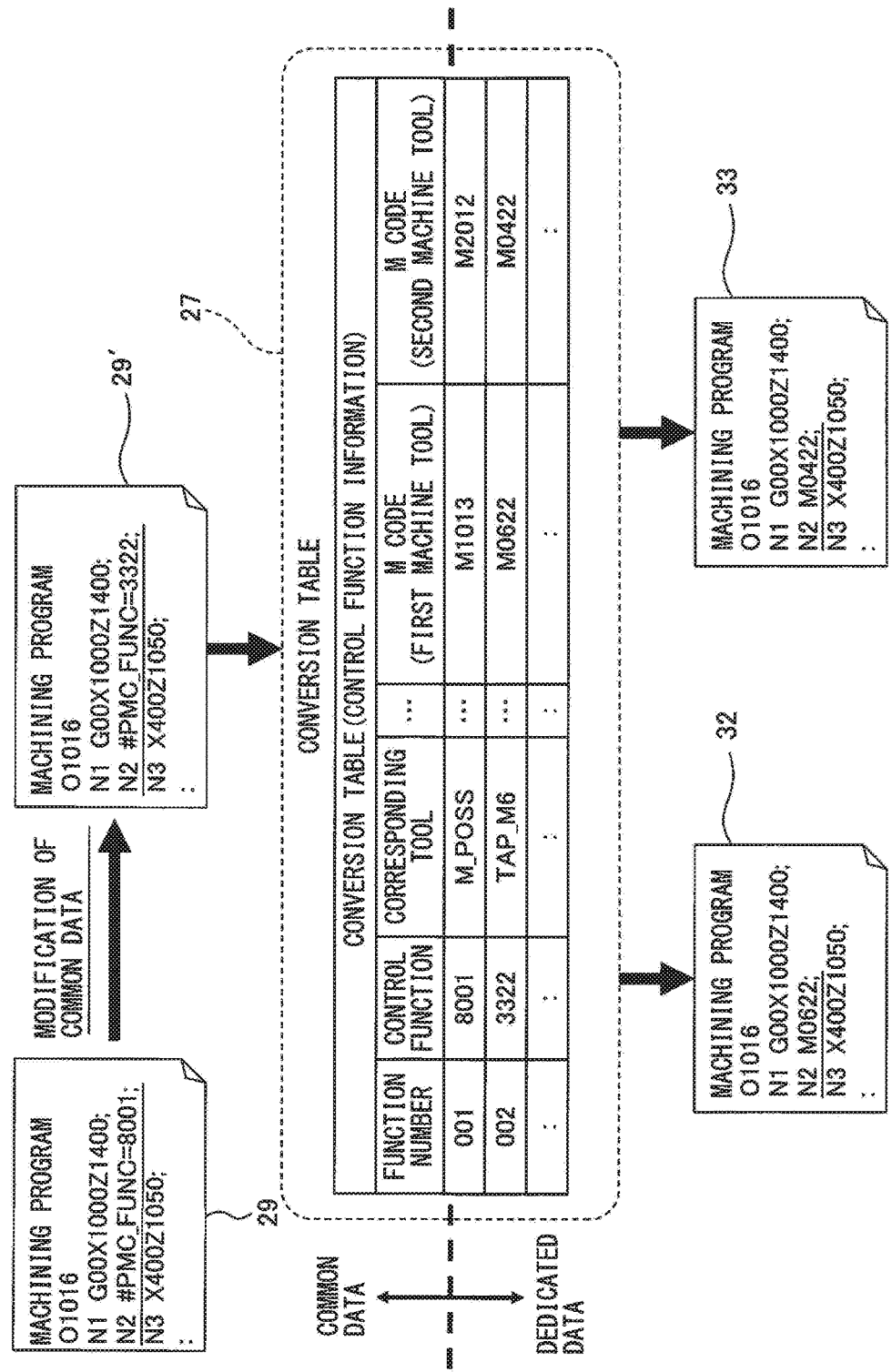

INFORMATION PROCESSING APPARATUS FOR PROCESSING MACHINING INFORMATION BETWEEN PLURALITY OF MANUFACTURING CELLS

RELATED APPLICATIONS

The present application claims priority to Japanese Patent Application No. 2016-098237 filed May 16, 2016, the disclosures of which is hereby incorporated by reference herein in its entirety.

BACKGROUND OF THE INVENTION

1. Field of the Invention

The present invention relates to an information processing apparatus for processing machining information between a plurality of manufacturing cells.

2. Description of the Related Art

In general, a large-scale factory has a plurality of manufacturing cells that carry out the same process, and these manufacturing cells are managed by a production planning apparatus. Installed in each individual manufacturing cell are a plurality of different machines such as machine tools, robots, and PLCs (programmable logic controllers) and a cell controller that controls these machines. Furthermore, the cell controllers are configured to share machining information, such as machining programs and configuration parameters, of the machines operating in the respective manufacturing cells.

For example, a host computer that controls the plurality of cell controllers is connected to each of the cell controllers via a network. Furthermore, machining information, such as machining programs and configuration parameters, that has been newly created or updated for the machines of each of the manufacturing cells, are acquired by the cell controller of that manufacturing cell and registered in the host computer. This allows at least one of the cell controllers to utilize machining information acquired by another cell controller. In other words, the construction of such a network-based cell control system allows all of the manufacturing cells and machines installed in the manufacturing cells to share the latest machining information.

Japanese Unexamined Patent Publication (Kokai) No. 5-216524 (hereinafter referred to as "PTL 1"), Japanese Unexamined Patent Publication (Kokai) No. 9-305213 (hereinafter referred to as "PTL 2"), and Japanese Unexamined Patent Publication (Kokai) No. 2013-134786 (hereinafter referred to as "PTL 3") disclose examples of methods for sharing data between a plurality of machines.

Further, in recent years, the application of a technique of machine learning or deep learning to a cell control system has been proposed. In this case, the cell control system's learning model and learning result are shared between a plurality of cell controllers. For this reason, a method for sharing data has been of increasing importance.

However, there has conventionally been some cases where differences in machine configurations between manufacturing cells make it impossible to share all machining information on an "as is" basis.

Examples of the differences in machine configurations include the manufacturers, control software, or ladder programs of the machines installed in the manufacturing cells, the shapes of workpiece holders, the fitting statuses of probes, sensors, or tools, and the like. These differences make it necessary to change the maximum current values, maximum voltage values, stroke limits, and the like of motors, which are designated as configuration parameters, and change the G codes, M codes, T codes, and the like in machining programs (NC programs).

This undesirably makes it difficult to share machining information such as configuration parameters and machining programs between a plurality of manufacturing cells. In order to solve this problem, an operator has had to find out such a difference in machine configuration for each individual manufacturing cell or for each machine in a manufacturing cell and modify dedicated data for each separate manufacturing cell or each separate machine in accordance with the difference.

Further, the technologies described in PTL 1 to PTL 3 have the following problems.

PTL 1 discloses a technology that can compare preset data set for a specific robot control apparatus and that set for a different robot control apparatus and, when there is a difference between the preset data thus compared, copy the preset data for the specific robot control apparatus into the different robot control apparatus.

However, the technology described in PTL 1 merely reflects preset data for a specific machine in another machine and therefore cannot create or manage common data that can be shared between manufacturing cells, nor can it convert common data into dedicated data for each separate manufacturing cell.

PTL 2 discloses a technology for converting a tool number in a machining program through the use of tool pot number conversion data corresponding to a tool fitted in an NC machine tool. However, it is difficult to share a machining program between NC machine tools simply by converting a tool number. In other words, with the technology disclosed in PTL 2, which cannot create or manage common data, it is difficult to efficiently share machining information between a plurality of manufacturing cells or between machines installed in the manufacturing cells.

PTL 3 discloses a technology including storing in advance machining information including machining procedures, the types and shapes of tools, and the like, formatting the formats of NC programs into formatted files with parts of the machining information as variables, and converting the variables into numerical values based on the machining information. However, PTL 3 discloses only a technology for converting parts of a machining program for each individual machine through the use of machining information, and does not disclose a technology for creating or managing common data between machines. This makes it impossible for a plurality of machines to share a machining program converted through the use of machining information.

SUMMARY OF THE INVENTION

The present invention provides an information processing apparatus that makes it possible to share machining information between manufacturing cells and between machines installed in the manufacturing cells.

A first aspect of the present disclosure provides an information processing apparatus for processing machining information so that the machining information is sharable between a plurality of manufacturing cells each including a plurality of machines. The information processing apparatus includes: a plurality of dedicated data storage units in which machining information to be set for each of the machines is stored as dedicated data for that machine; a common data storage unit in which machining information that is common to the plurality of manufacturing cells is stored as common data; a configuration information management unit configured to collect configuration information of each of the manufacturing cells or each of the machines and, on the basis of the configuration information, generate a conversion table that associates system common information with dedicated information for each of the machines that corresponds to the system common information; a data conversion unit that at least either converts the dedicated data for each of the machines into the common data in accordance with the dedicated information for each of the machine in the conversion table or converts the common data into the dedicated data for each of the machines in accordance with the system common information in the conversion table; and a common data management unit configured to store, in the common data storage unit, the common data generated by the data conversion unit and configured to transfer the common data stored in the common data storage unit to the data conversion unit.

A second aspect of the present disclosure provides the information processing apparatus of the first aspect, wherein the machining information includes at least one of a machining program, a configuration parameter, an offset value, tool information, and a ladder program.

A third aspect of the present disclosure provides the information processing apparatus of the first or second aspect, wherein the configuration information includes information concerning a machine configuration and a machine condition of each of the machines installed in each of the manufacturing cells.

A fourth aspect of the present disclosure provides the information processing apparatus of any one of the first to third aspects, wherein the system common information includes information that is common to the plurality of manufacturing cells and information that is common to machines of the same types installed in each of the manufacturing cells.

A fifth aspect of the present disclosure provides the information processing apparatus of any one of the first to fourth aspects, wherein the common data management unit is configured to be able to communicate with external equipment provided outside the information processing apparatus, and the common data management unit has a function of receiving, from the external equipment, a request for updating the common data stored in the common data storage unit and a request for transferring the common data stored in the common data storage unit to the external equipment or the data conversion unit.

BRIEF DESCRIPTION OF THE DRAWINGS

These and other objects, features, and advantages of the present invention will be made clearer from the detailed description of a typical embodiment of the present disclosure with reference to the accompanying drawings.

FIG. 8 is a diagram illustrating an example of an aspect in which external equipment is connected to the common data management unit; and FIG. 9 is a diagram schematically illustrating how common data is modified by the external equipment to newly generate dedicated data for machines.

DETAILED DESCRIPTION

Figure 1:
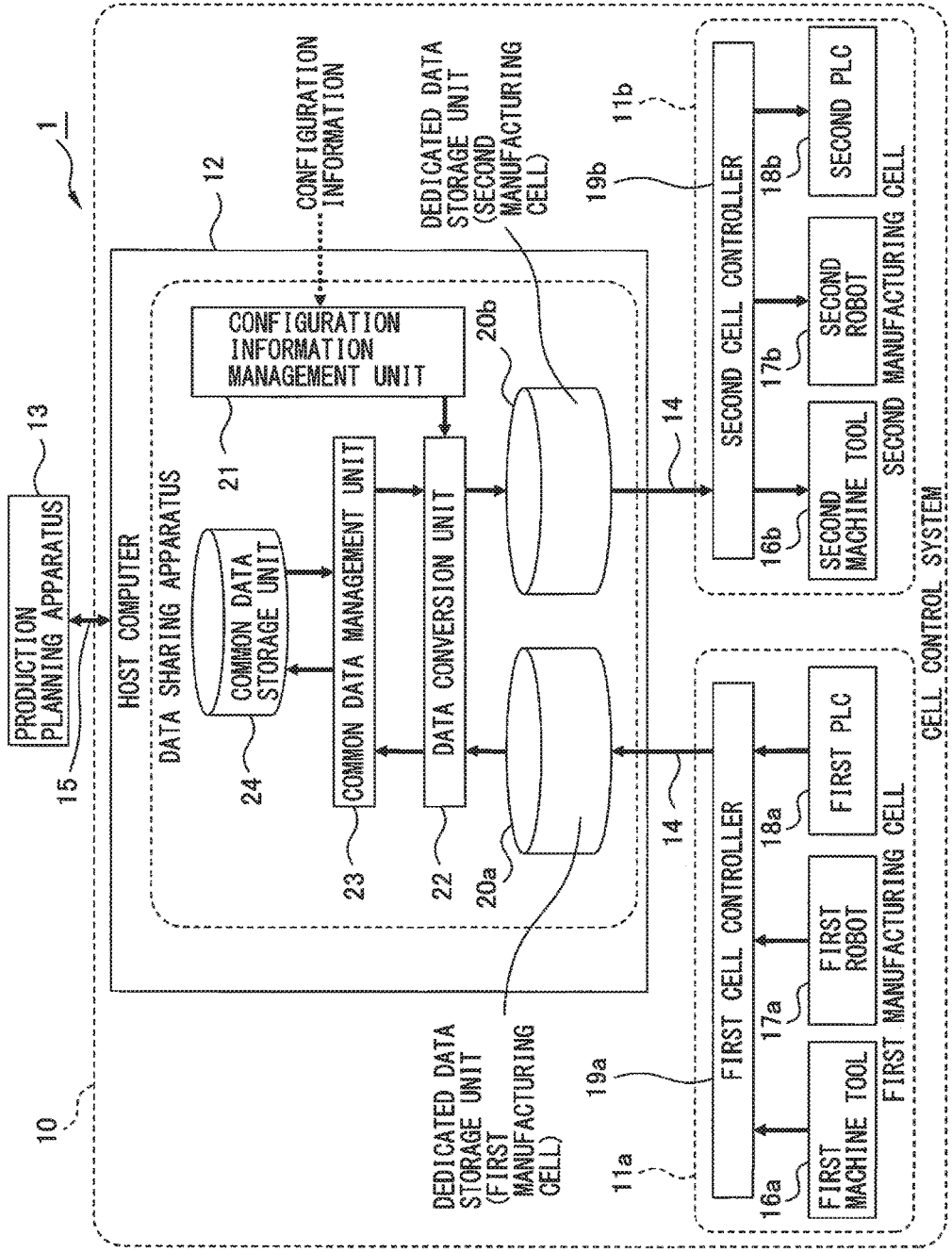
FIG. 1 is a block diagram schematically illustrating a production system including a cell control system of an embodiment.

Next, an embodiment of the present disclosure is described with reference to the drawings. In the following drawings, the same members are given the same reference numerals. For ease of comprehension, these drawings have their scales changed as appropriate. Further, an embodiment illustrated in the drawings is one example for carrying out the present invention, and the present invention is not limited to the illustrated embodiment.

FIG. 1 is a block diagram schematically illustrating a production system including a cell control system of an embodiment of the present disclosure.

As illustrated in FIG. 1, a production system 1 includes a cell control system 10 and a production planning apparatus 13. The cell control system 10 includes a plurality of manufacturing cells 11a and 11b and a host computer 12.

The manufacturing cells 11a and 11b are placed, for example, in a manufacturing factory in which products are manufactured. On the other hand, the host computer 12 is placed in the manufacturing factory or in a building that is different from the manufacturing factory. For example, the host computer 12 may be placed in the neighborhood of the manufacturing cells 11a and 11b or in another building located within the premises of the manufacturing factory in which the manufacturing cells 11a and 11b are placed. In this case, it is preferable that each of the manufacturing cells 11a and 11b be communicably connected to the host computer 12 via a network 14 such as an intranet.

The production planning apparatus 13 may be placed, for example, in an office located in a remote place from the manufacturing factory. In other words, it is preferable that the production planning apparatus 13 be a computer on the cloud. In this case, it is preferable that the production planning apparatus 13 be communicably connected to the host computer 12 via a network such as the Internet. Further, it is preferable that the production planning apparatus 13 be an apparatus that, in the office, formulates a manufacturing plan for manufacturing products for each of the manufacturing cells 11a and 11b and manages the statuses of the manufactures.

Each of the manufacturing cells 11a and 11b of the present embodiment is a group of machines combined to carry out a process for manufacturing the same products. The combination of machines is, for example, a combination of a machine tool, a robot, and a PLC. In other words, as illustrated in FIG. 1, the first manufacturing cell 11a includes a first machine tool 16a, a first robot 17a, a first PLC 18a, and a first cell controller 19a that controls these machines. The second manufacturing cell 11b includes a second machine tool 16b, a second robot 17b, a second PLC 18b, and a second cell controller 19b that controls these machines.

The first machine tool 16a and the second machine tool 16b are numerically controlled machines configured to perform machining, such as cutting, by moving tools relative to workpieces (i.e., objects being worked on) held by workpiece holders.

The first robot 17a and the second robot 17b place the workpieces in the first machine tool 16a and the second machine tool 16b, respectively, and, after the workpieces have been machined, remove the workpieces from the first machine tool 16a and the second machine tool 16b, respectively.

The first PLC 18a controls the order of tasks that the first machine tool 16a and the first robot 17a perform. Similarly, the second PLC 18b controls the order of tasks that the second machine tool 16b and the second robot 17b perform.

In the present disclosure, the number of manufacturing cells is not limited to 2, although FIG. 1 illustrates only the two manufacturing cells 11a and 11b. Further, the combination of machines that are to be installed in each of the manufacturing cells 11a and 11b is not limited to a combination of a machine tool, robot, and a PLC, either.

Furthermore, each of the aforementioned machines that are to be installed in the manufacturing cells 11a and 11b and the cell controllers 19a and 19b include arithmetic processing apparatuses (not illustrated) each including a memory, such as a ROM or a RAM, a CPU, and a communication control unit that are connected to one another via buses. These communication control units are configured to control exchange of information between the cell controllers 19a and 19b and the respective machines.

The host computer 12 is an information processing apparatus including a memory, such as a ROM or a RAM, a CPU, and a communication control unit (not illustrated) that are connected to one another via buses. This communication control unit is configured to control the exchange of information between the host computer 12 and external equipment, such as each of the cell controllers 19a and 19b, the production planning apparatus 13 and a display device (not illustrated).

Furthermore, the host computer 12 is configured to allow data to be shared between the manufacturing cells 11a and 11b each including the plurality of machines. In other words, the host computer 12 is an information processing apparatus including a data sharing apparatus.

Specifically, as illustrated in FIG. 1, the host computer 12 includes a plurality of dedicated data storage units 20a and 20b, a configuration information management unit 21, a data conversion unit 22, a common data management unit 23, and a common data storage unit 24. It is preferable that the functional units (20a to 24) be controlled by the CPU (not illustrated) of the host computer 12 or that the functional units (20a to 24) be configured to function under the command of a program stored in the memory of the host computer 12.

In the dedicated data storage unit 20a, machining information to be set for a machine in the first manufacturing cell 11a is stored as dedicated data for the machine. Similarly, in the dedicated data storage unit 20b, machining information to be set for a machine in the second manufacturing cell 11b is stored as dedicated data for the machine. The term "machining information" here refers to a machining program, a configuration parameter, and the like.

The configuration information management unit 21 collects configuration information of each of the manufacturing cells 11a and 11b or configuration information of each of the machines installed in each of the manufacturing cells 11a and 11b and, on the basis of these pieces of configuration information, generates a conversion table that associates system common information with dedicated information for each individual machine that corresponds to the system common information. The configuration information management unit 21 transfers the conversion table thus created to the data conversion unit 22.

The term "configuration information" refers to information concerning machine configurations, such as the manufacturers, control software, or ladder programs of the machines installed in the manufacturing cells 11a and 11b. Furthermore, the term "configuration information" also encompasses information concerning machine conditions, such as the shapes of workpiece holders and the fitting statuses of probes, sensors, and tools.

The term "system common information" refers to information that is common to the manufacturing cells 11a and 11b and information that is common to machines of the same type installed in each of the manufacturing cells 11a and 11b. In the field of machine tools and industrial robots, information concerning their various control functions are managed by assigning management numbers to the control functions. Therefore, for example, such management numbers of control functions can be system common information.

The term "machine-dedicated information" refers to a function code, a control code, a set value, and the like to be set for each machine.

It is preferable that such "configuration information" be collected via the communication control unit (not illustrated) of the host computer 12 from external equipment provided outside the host computer 12. An example of the external equipment is the production planning apparatus 13, each of the cell controllers 19a and 19b, or the display device (not illustrated), all of which are communicably connected to the host computer 12.

Figure 2:
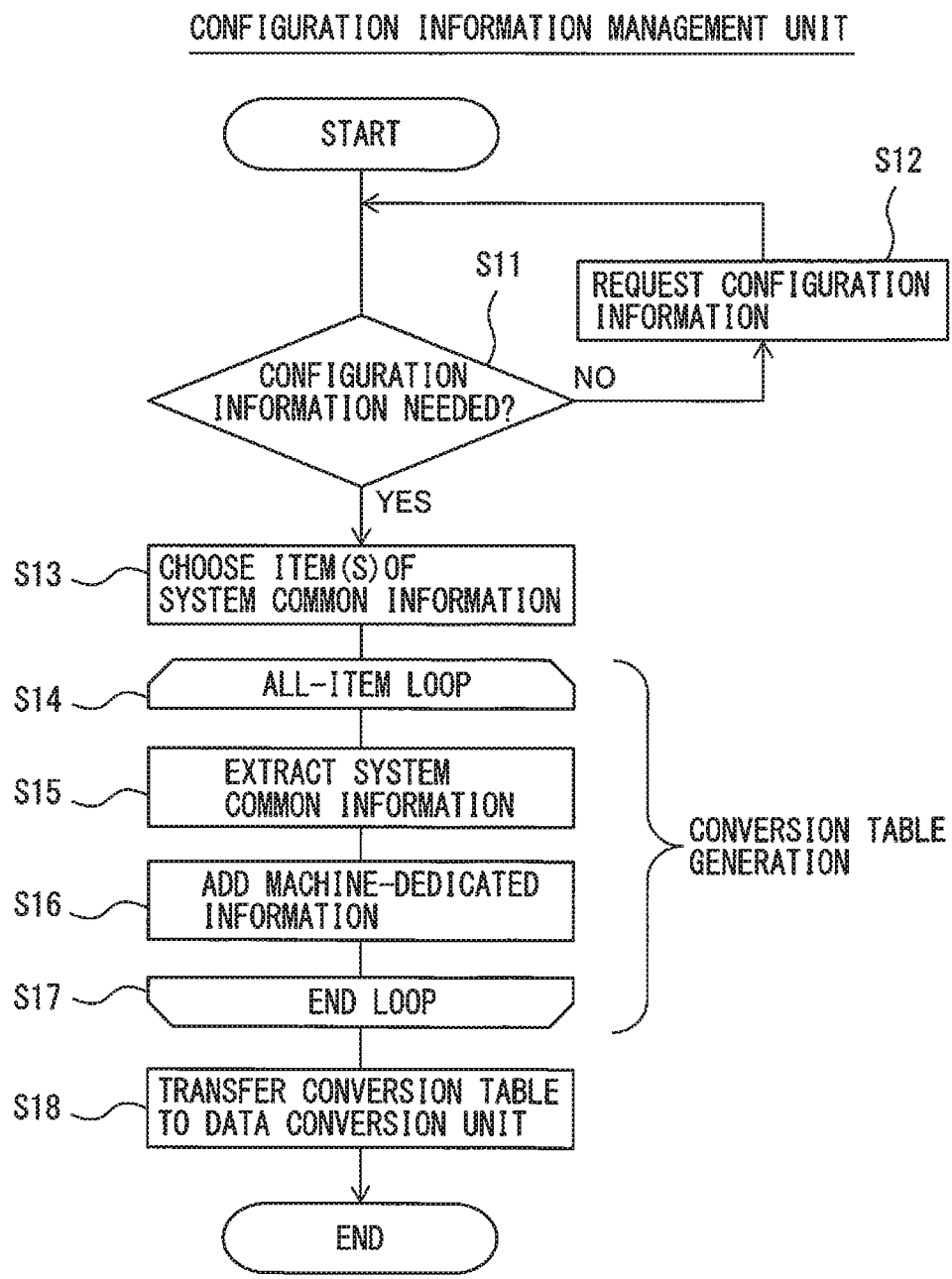
FIG. 2 is a flow chart illustrating an example of a procedure that is performed by a configuration information management unit illustrated in FIG. 1.

An example of a procedure that is performed by the configuration information management unit 21 is described here with reference to FIG. 2. FIG. 2 is a flow chart illustrating an example of a procedure that is performed by the configuration information management unit 21.

First, in step S11 of FIG. 2, the configuration information management unit 21 determines whether such configuration information is needed in the configuration information management unit 21. When, as a result, such configuration information is not present in the configuration information management unit 21 or need to be updated, the configuration information management unit 21 requests the external equipment for configuration information (step S12 of FIG. 2). On the other hand, when such configuration information is present in the configuration information management unit 21 or does not need to be updated, the configuration information management unit 21 proceeds to step S13 of FIG. 2.

In step S13 of FIG. 2, the configuration information management unit 21 chooses, from among the configuration information of a plurality of machines that has been collected from the external equipment, at least one item (category) that is to be used as system common information. It is preferable that this choice be made on the basis of information registered in advance in the configuration information management unit 21, information inputted from the display device (not illustrated), or the like. An example of an item that is to be used as system common information is a control function of machines that is managed by a management number.

Next, once in step S14 of FIG. 2, a conversion table generation process including steps S14 to S17 of FIG. 2 is repeated as many times as the number of items chosen.

Specifically, in step S15 of FIG. 2, the configuration information management unit 21 extracts, from the configuration information thus collected, system common information that falls under the item(s) chosen, and generates a conversion table. Furthermore, in step S16 of FIG. 2, the configuration information management unit 21 adds, to the conversion table in which the system common information thus extracted is recorded, dedicated information for each individual machine that corresponds to the system common information.

After that, in step S17 of FIG. 2, when it has been confirmed that such a conversion table generation process has been repeated as many times as the number of items chosen, the configuration information management unit 21 ends the generation of the conversion table. A conversion table generation process such as the above generates a conversion table that associates system common information of an item(s) chosen with dedicated information for each individual machine that corresponds to the system common information.

Then, in step S18 of FIG. 2, the configuration information management unit 21 transfers the conversion table thus generated to the data conversion unit 22.

With continued reference to FIG. 1, the functions of the data conversion unit 22 are described.

The data conversion unit 22 converts dedicated data for each separate machine into a single piece of common data in accordance with dedicated information for each machine in the conversion table generated by the configuration information management unit 21. Further, the data conversion unit 22 converts a single piece of common data into dedicated data for each separate machine in accordance with the system common information in the conversion table generated by the configuration information management unit 21. The term "dedicated data for each separate machine" refers to machining information for each machine, e.g., a machining program for each machine, and the term "common data" refers to machining information that is common to a plurality of machines having functions of the same type, e.g., a common machining program.

Figure 3:
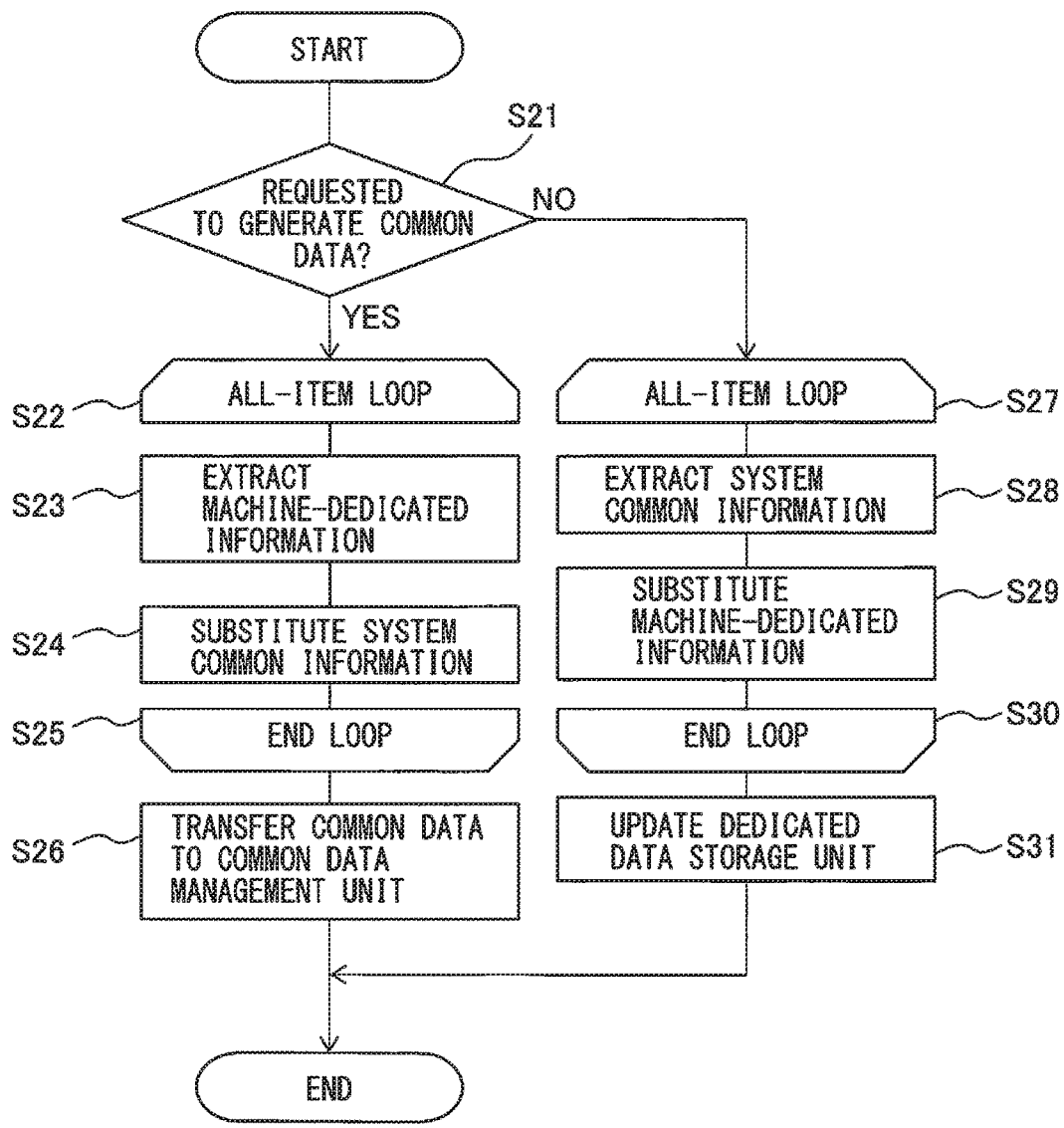
FIG. 3 is a flow chart illustrating an example of a procedure that is performed by a data conversion unit illustrated in FIG. 1.

An example of a procedure that is performed by the data conversion unit 22 is described with reference to FIG. 3. FIG. 3 is a flow chart illustrating an example of a procedure that is performed by the data conversion unit 22.

First, in step S21 of FIG. 3, the data conversion unit 22 determines whether it is requested to generate common data. When the data conversion unit 22 has determined that it is requested to generate common data, the data conversion unit 22 repeats a common data generation process as many times as the number of items chosen. This common data generation process includes steps S22 to S25 of FIG. 3.

Specifically, in step S23 of FIG. 3, the data conversion unit 22 extracts dedicated information for a machine in the first manufacturing cell 11a from machining information of the machine. Examples of this machining information include a machining program, a configuration parameter, or the like of the machine, and examples of this dedicated information include a control code, a set value, and the like of the machine. Then, in step S24 of FIG. 3, on the basis of the aforementioned conversion table, the data conversion unit 22 substitutes, for the machine-dedicated information thus extracted, system common information that corresponds to the dedicated information. By so doing, the data conversion unit 22 generates machining information, i.e., common data, based on system common information that can be recognized and converted by manufacturing cells or machines of the same type.

After that, in step S25 of FIG. 3, when it has been confirmed that such a common data generation process has been repeated as many times as the number of items chosen, the data conversion unit 22 ends the generation of the common data. Then, in step S26 of FIG. 3, the data conversion unit 22 transfers the common data thus generated to the common data management unit 23.

It is preferable that such a request for generation of common data in step S21 be made by the production planning apparatus 13, each of the cell controllers 19a and 19b, the display device (not illustrated), or the like, all of which are communicably connected to the host computer 12.

Assume, on the other hand, that the data conversion unit 22 has determined in step S21 that it is not requested to generate common data, i.e., that it is requested to generate dedicated data. In this case, a dedicated data generation process including steps S27 to S30 of FIG. 3 is repeated as many times as the number of items chosen.

Specifically, in step S28 of FIG. 3, the data conversion unit 22 extracts, from common data in the common data management unit 23, an item that falls under system common information. Then, in step S29 of FIG. 3, on the basis of the aforementioned conversion table, the data conversion unit 22 substitutes, for the system common information thus extracted, dedicated information for a machine in the second manufacturing cell 11b. This dedicated information corresponds to items that fall under the system common information. By so doing, the data conversion unit 22 generates machining information, i.e., dedicated data, based on the dedicated information for the machine of the second manufacturing cell 11b.

After that, in step S30 of FIG. 3, when it has been confirmed that such a dedicated data generation process has been repeated as many times as the number of items chosen, the data conversion unit 22 ends the generation of the dedicated data. Then, in step S31 of FIG. 3, the data conversion unit 22 transfers the dedicated data thus generated to the dedicated data storage unit 20b and thereby updates the dedicated data stored in the dedicated data storage unit 20b.

With continued reference to FIG. 1, the functions of the common data management unit 23 and the common data storage unit 24 are described.

The common data management unit 23 stores, in the common data storage unit 24, common data generated by the data conversion unit 22, i.e., updates the common data, or transfers common data stored in the common data storage unit 24 to the data conversion unit 22.

The common data management unit 23 is configured to be able to communicate with external equipment such as the production planning apparatus 13, each of the cell controllers 19a and 19b, and the display device (not illustrated) via the communication control unit (not illustrated) of the host computer 12. This makes it possible to use the external equipment to confirm or edit common data before converting the common data into dedicated data for each separate machine.

Furthermore, it is preferable that the common data management unit 23 have the function of receiving, from the external equipment, a request for updating the common data stored in the common data storage unit 24 (such a request being hereinafter referred to as "update request") and a request for transferring common data to the external equipment or the data conversion unit 22 (such a request being hereinafter referred to as "transfer request").

Figure 4:
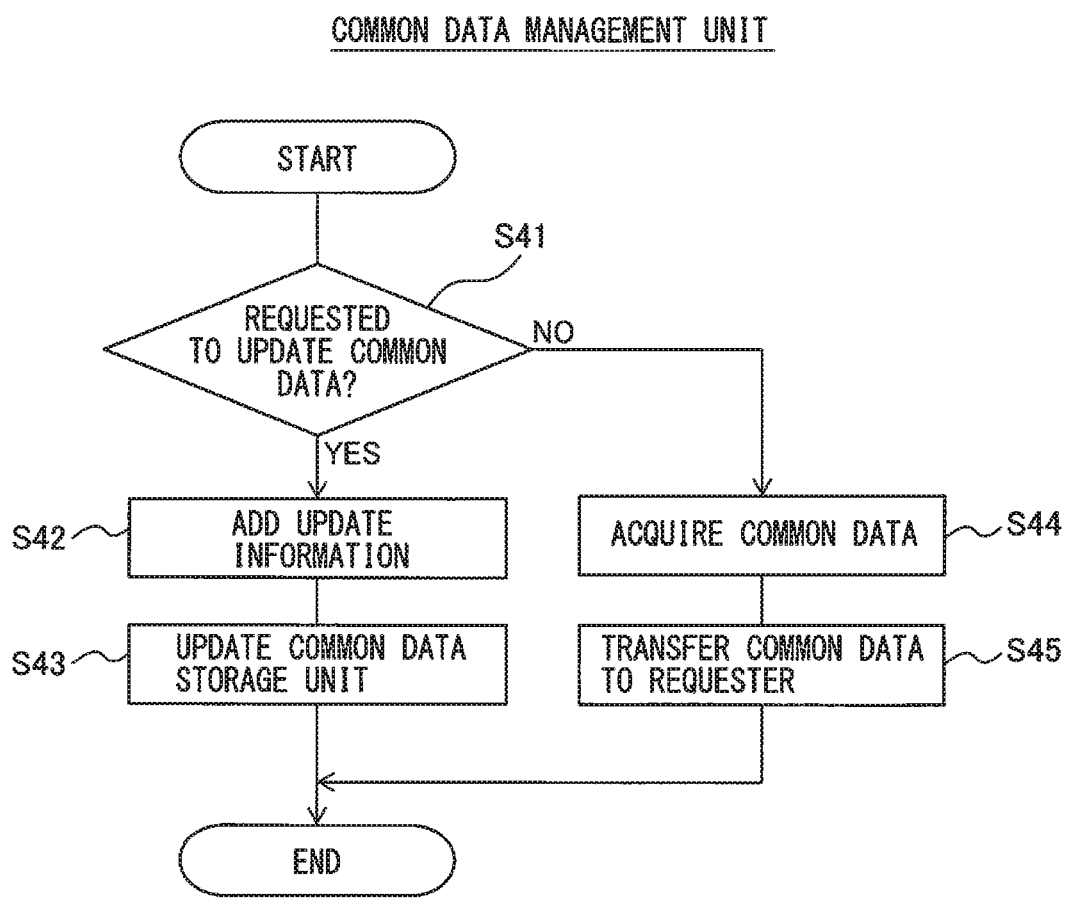
FIG. 4 is a flow chart illustrating an example of a procedure that is performed by a common data management unit illustrated in FIG. 1.

An example of a procedure that is performed by the common data management unit 23 is described with reference to FIG. 4. FIG. 4 is a flow chart illustrating an example of a procedure that is performed by the common data management unit 23.

First, in step S41 of FIG. 4, the common data management unit 23 determines whether it is requested to update the common data. When the common data management unit 23 has determined that it is requested to update the common data, the common data management unit 23 executes processing of step S42 of FIG. 4. Specifically, the common data management unit 23 adds, to common data generated by the data conversion unit 22, update information such as the identification (ID) number of this common data and the date and time of generation of this common data. Then, the common data management unit 23 stores, in the common data storage unit 24, the common data to which the update information has been added. In other words, in step S43 of FIG. 4, the common data stored in the common data storage unit 24 is updated.

On the other hand, when the common data management unit 23 has determined in step S41 that it is not requested to update the common data, i.e., that it is requested to transfer common data, the common data management unit 23 executes processing of step S44 of FIG. 4. Specifically, the common data management unit 23 acquires, from the common data storage unit 24, common data that the common data management unit 23 is requested to transfer. Furthermore, in step S45 of FIG. 4, the common data management unit 23 transfers the common data thus acquired to the requester such as a manufacturing cell or a machine in the manufacturing cell.

It is preferable that such an update request or transfer request in step S41 be made from the production planning apparatus 13, each of the cell controllers 19a and 19b, the display device (not illustrated), or the like via the communication control unit of the host computer 12.

Specific Example

Figure 5:
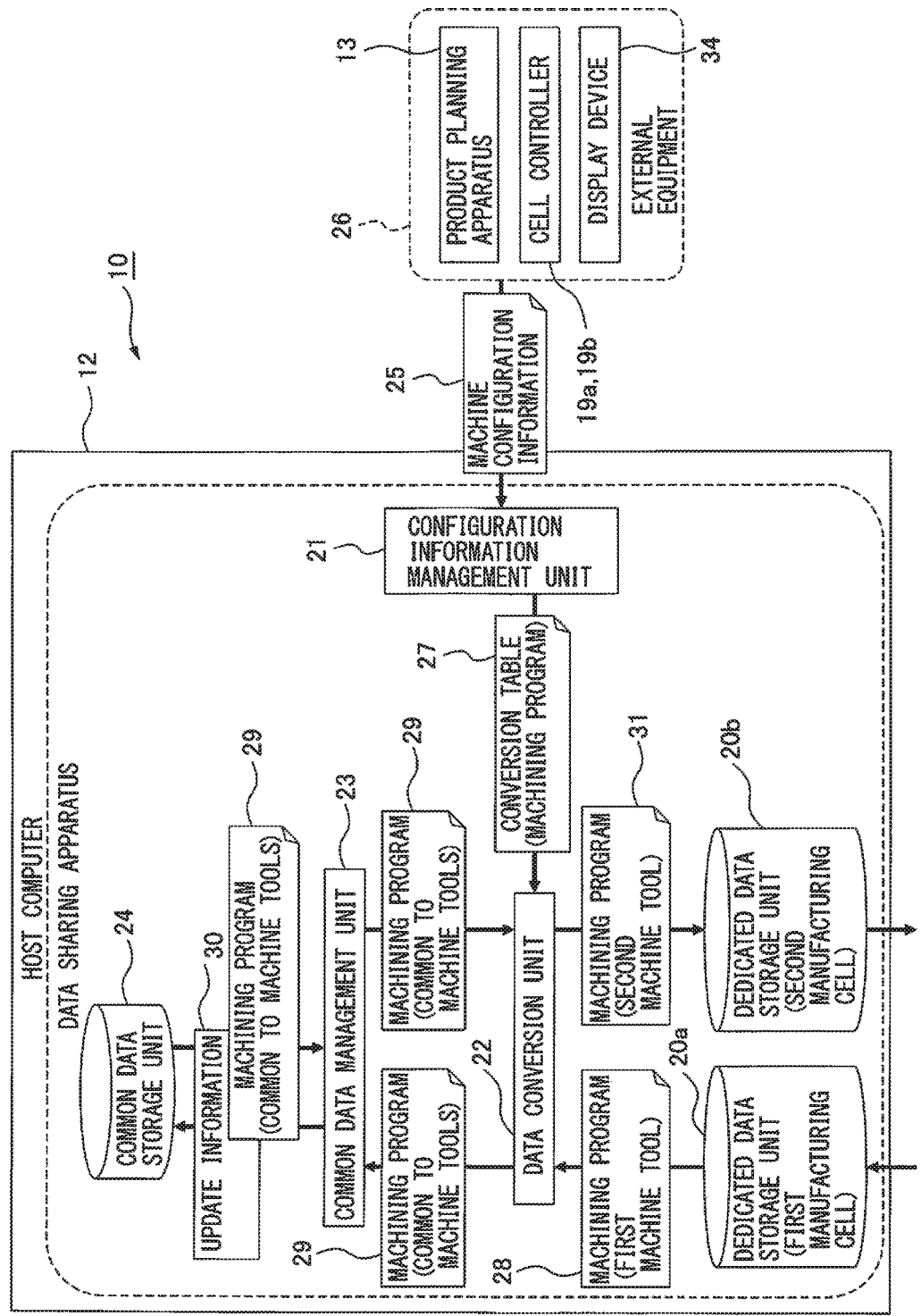
FIG. 5 is a block diagram more specifically illustrating the functions of a host computer illustrated in FIG. 1.

FIG. 5 is a block diagram more specifically illustrating the functions of the host computer 12 illustrated in FIG. 1. In the following, the functions of the host computer 12 are described in detail by a specific example with reference to FIG. 5. In particular, a case is described where a machining program created for the first machine tool 16a in the first manufacturing cell 11a is used for the second machine tool 16b in the second manufacturing cell 11b.

For example, the two machine tools 16a and 16b may differ from each other in terms of peripheral equipment, such as probes and sensors, mounted thereon. Furthermore, a difference in executable function or ladder program between the two machine tools 16a and 16b may cause the two machine tools 16a and 16b to have different M codes under the command of a machining program (NC program). In such a case, the two machine tools 16a and 16b cannot share the machining program on an "as is" basis.

Accordingly, in the present specific example, the configuration information management unit 21 illustrated in FIG. 5 collects the respective pieces of configuration information 25 of the first machine tool 16a and second machine tool 16b from external equipment 26. The external equipment 26 is the production planning apparatus 13, each of the cell controllers 19a and 19b, or a display device 34, all of which are communicably connected to the host computer 12.

Examples of the display device 34 include a display unit of an operation panel of a machine tool, a display unit of a teaching operator's panel of a robot, a display panel attached to a personal computer, and the like.

Then, as illustrated in FIG. 5, the configuration information management unit 21 generates a conversion table 27 for the machining program from the configuration information 25 thus collected. This conversion table 27 contains management numbers by which the control functions of the peripheral equipment that is controlled by the respective machine tools 16a and 16b and M codes that respectively correspond to the control functions.

Figure 6:
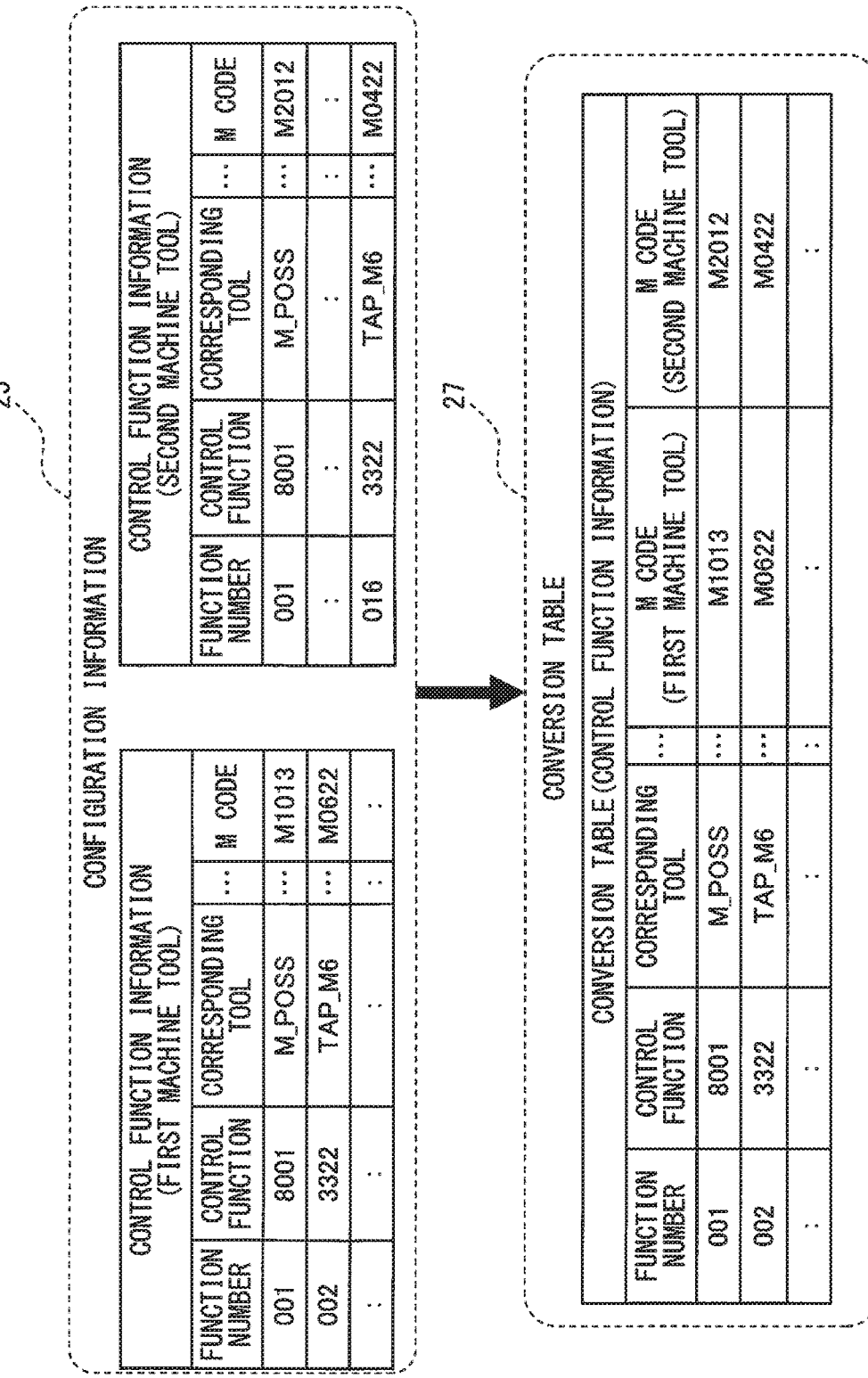
FIG. 6 is a diagram schematically illustrating how a conversion table is generated.

FIG. 6 is a diagram schematically illustrating how the conversion table 27 is generated. Assume here that, as illustrated in FIG. 6, control function information of the first machine tool 16a and control function information of the second machine tool 16b are collected as the configuration information 25 in the configuration information management unit 21. In generating the conversion table 27 from the configuration information 25 thus collected, information on control functions that are common to the two machine tools 16a and 16b (e.g., management numbers such as "8001" and "3322") is selected as system common information. To the conversion table 27, only the control functions that are common to the two machine tools 16a and 16b are written, and the M codes of the first machine tool 16a and second machine tool 16b that respectively correspond to the control functions are also added. For example, as illustrated in FIG. 6, the M codes (M1013 and M2012) of the first machine tool 16a and second machine tool 16b that correspond to the management number (8001) of a common control function are written together onto one conversion table 27.

Furthermore, the conversion table 27 is transferred from the configuration information management unit 21 to the data conversion unit 22 illustrated in FIG. 5.

Further, in the dedicated data storage unit 20a, a machining program 28 for the first machine tool 16a is loaded and stored in advance. Upon receiving a common data generation request from the external equipment 26, the data conversion unit 22 converts the machining program 28 for the first machine tool 16a into a machining program 29 in accordance with the conversion table 27. The machining program 29 is common to the two machine tools 16a and 16b.

The common data management unit 23 adds update information 30 to the common machining program 29. Examples of the update information 30 include information such as the date and time of generation of common data and an identification number assigned to the first machine tool 16a storing the machining program 28 to be converted. Furthermore, the common data management unit 23 stores, in the common data storage unit 24, the machining program 29 to which the update information 30 has been added.

Figure 7:
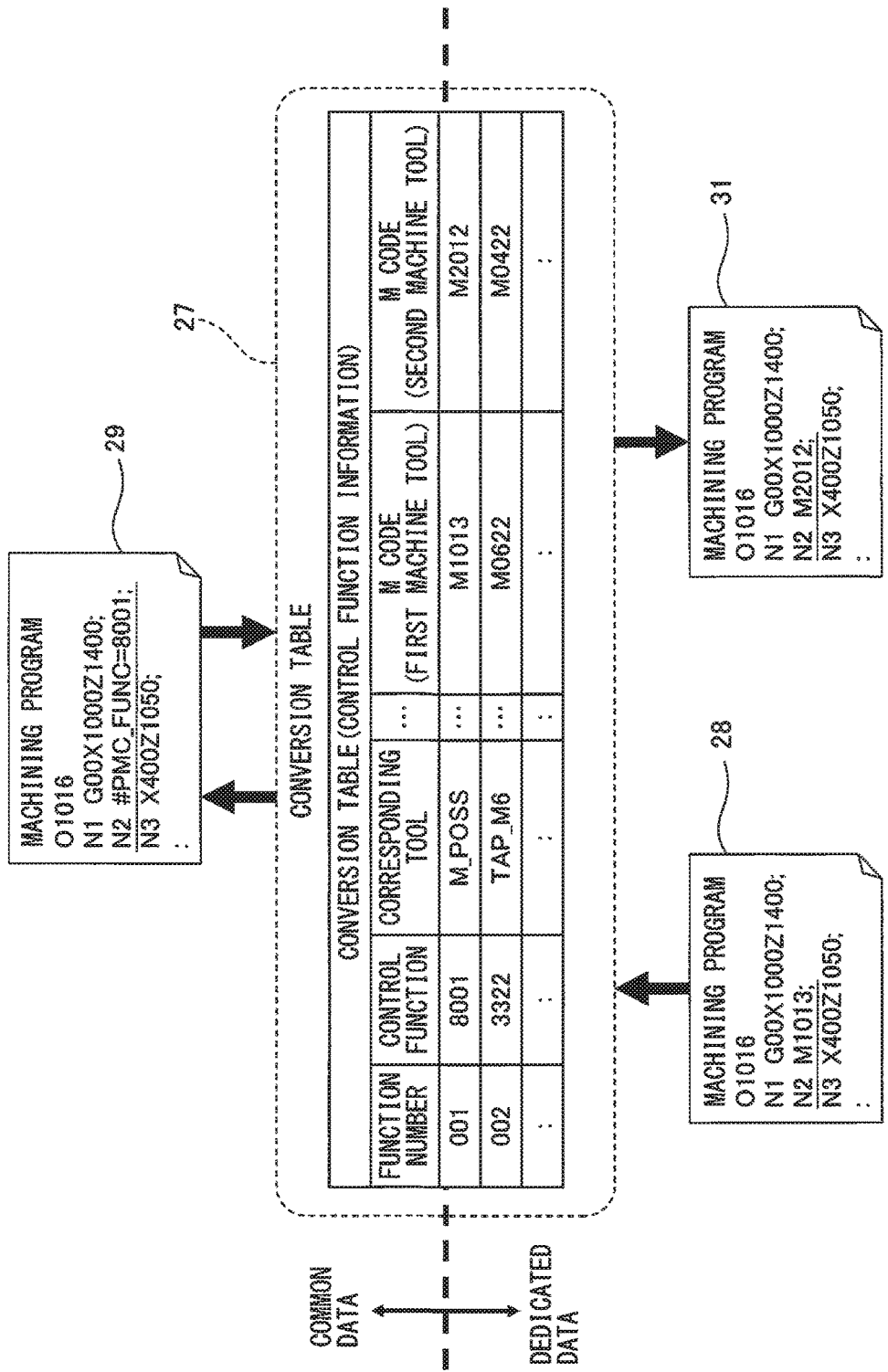
FIG. 7 is a diagram schematically illustrating how a machining program that is common to two machine tools is created.

FIG. 7 is a diagram schematically illustrating how the machining program 29, which is common to the two machine tools 16a and 16b, is created. By the common data management unit 23, a description corresponding to the M code (M1013), which is listed in the conversion table 27 as dedicated information for the first machine tool 16a, is extracted from the machining program 28 for the first machine tool 16a as illustrated in FIG. 7. Then, as can be seen from the common machining program 29 illustrated in FIG. 7, the description of the M code in the machining program 28 is substituted by a description of a control function listed as system common information in the conversion table 27, i.e., a description containing the management number (8001). Thus, the machining program 28 for the first machine tool 16a is converted into the machining program 29, which serves as common data for the two machine tools 16a and 16b, in accordance with the conversion table 27.

Further, for example, when a machining program 31 for the second machine tool 16b is created from the common machining program 29, the following method is employed.

In other words, the description of the control function listed as system common information in the conversion table 27, i.e., the description containing the management number (8001), is extracted from the common machining program 29 illustrated in FIG. 7. Furthermore, as can be seen from the machining program 31 for the second machine tool 16b as illustrated in FIG. 7, the description of the control function in the common machining program 29 is substituted with a description of the M code (M2012), which corresponds to the control function (8001) as dedicated information for the second machine tool 16b, of the conversion table 27. Thus, the common machining program 29 is converted into the machining program 31, which serves as dedicated data for the second machine tool 16b, in accordance with the conversion table 27. This machining program 31 is stored in the dedicated data storage unit 20b, which corresponds to the second machine tool 16b.

Although the foregoing description has been given by taking a machining program for a machine tool as an example of machining information that serves as dedicated data and common data for machines, the machining information is not limited to the machining program. In other words, it is preferable that machining information that is applicable to the present invention include at least one of a machining program, a configuration parameter, an offset value, tool information, and a ladder program.

Furthermore, it is preferable that the common data management unit 23 illustrated in FIG. 5 be communicably connected to the external equipment 26. FIG. 8 is a diagram illustrating an example of an aspect in which the external equipment 26 is so connected to the common data management unit 23.

As illustrated in FIG. 8, the common data management unit 23 is configured to be able to communicate with the external equipment 26, such as the production planning apparatus 13, each of the cell controllers 19a and 19b, and the display device 34, via the communication control unit (not illustrated) of the host computer 12. It is preferable that the common data management unit 23 have the function of receiving, from the external equipment 26, a request for an update to a common machining program 29 that is present in the common data storage unit 24 and a request for a transfer of the machining program 29 to the external equipment 29 or the data conversion unit 22. This allows the operator to modify the common machining program 29 before the common machining program 29 is converted by the data conversion unit 22 into a machining program for a specific machine tool.

FIG. 9 is a diagram schematically illustrating how common data stored in the common data storage unit 24 is modified by the external equipment 26 as described above to newly generate dedicated data for machines.

As illustrated in FIG. 9, for example, the description of the control function in the machining program 29 as common data, i.e., the description containing the management number (8001), is modified into a description containing another management number (3322). This modification is made by the operator using the external equipment 26 illustrated in FIG. 8.

After that, a description of a control function listed as system common information in the conversion table 27, i.e., the description containing the management number (3322), is extracted from the common machining program 29' thus modified. Then, as illustrated in FIG. 9, two new machining programs 32 and 33 are generated. Specifically, in the generation of the machining program 32, the description containing the management number (3322) of the control function in the common machining program 29' is substituted for by a description of the M code (M0622), which corresponds to the management number (3322) as dedicated information for the first machine tool 16a, of the conversion table 27. In the generation of the machining program 33, the description containing the management number (3322) of the control function in the common machining program 29' is substituted for by a description of the M code (M0422), which corresponds to the management number (3322) as dedicated information for the second machine tool 16b, of the conversion table 27.

By thus using the external equipment 26 to modify a description of system common information in the machining program 29 as common data via the common data management unit 23, the need to individually modify dedicated data for the first machine tool 16a and the second machine tool 16b is eliminated. Of course, even in the case of a change in the ladder program of each of the PLCs 18a and 18b illustrated in FIG. 1 or a change in content of the task that is performed by each of the robots 17a and 17b, the need to individually modify dedicated data for each individual machine is eliminated by modifying the common data stored in the common data storage unit 24. Further, it is preferable that the conversion table 27 be configured to be able to be referred to and modified by the external equipment 26.

The host computer 12 of the present embodiment described above brings about the following effects.

In the conventional technologies, machining information such as machining programs and configuration parameters has been managed for each separate manufacturing cell 11a or 11b or for each separate machine in each of the manufacturing cells 11a and 11b. On the other hand, the host computer 12 of the present embodiment can convert the machining information, which has been otherwise managed for each separate manufacturing cell 11a or 11b or for each separate machine of the same type in each of the manufacturing cells 11a and 11b, into common data and centrally manage the common data.

Furthermore, the host computer 12 of the present embodiment can convert machining information serving as common data into appropriate dedicated data in accordance with each of the manufacturing cells 11a and 11b or the machines in each of the manufacturing cells 11a and 11b. This eliminates the need for the operator to extract differences in machine configurations for each separate manufacturing cell or for each separate machine in each of the manufacturing cells and modify the machining information. This makes it possible to quickly activate the machines and load the latest data into each of the machines.

Further, the host computer 12 of the present embodiment makes it possible to use the external equipment 26 to modify, via the common data management unit 23, common data stored in the common data storage unit 24. When the common data is modified before it is converted into dedicated data, new dedicated data can be generated in accordance with the common data thus modified. This brings about an effect of eliminating the need to individually modify each piece of dedicated data even in the case of a change in content of the task for each manufacturing cell or for each machine in each of the manufacturing cells.

Although the present invention has been described above with reference to a typical embodiment, a person skilled in the art will understand that a change and other various changes, omissions, and additions can be made to each of the embodiments described above without departing from the scope of the present disclosure.

ADVANTAGEOUS EFFECTS OF THE INVENTION

An aspect of the present disclosure makes it possible to convert machining information, such as machining programs and configuration parameters, which has been otherwise managed for each separate manufacturing cell or for each separate machine in each of the manufacturing cells, into common data and centrally manage the common data. Furthermore, the common data can be converted into appropriate dedicated data in accordance with each of the manufacturing cells or the machines in each of the manufacturing cells. This makes it possible to quickly activate the machines and load the latest data into each of the machines.

Furthermore, another aspect of the present disclosure makes it possible to use the external equipment to modify, via the common data management unit, common data stored in the common data storage unit. When the common data is modified before it is converted into dedicated data, new dedicated data can be generated in accordance with the common data thus modified. This brings about an effect of eliminating the need to individually modify each piece of dedicated data.

The invention claimed is:

1. An information processing apparatus for processing machining information so that the machining information is sharable between a plurality of manufacturing cells each including a plurality of machines, the information processing apparatus comprising:
   a plurality of dedicated data storage units in which machining information to be set for each of the machines is stored as dedicated data for that machine;
   a common data storage unit in which machining information that is common to the plurality of manufacturing cells is stored as common data;
   a configuration information management unit configured to collect control function information as configuration information of each of the manufacturing cells or each of the machines and, on the basis of the control function information, automatically generate a conversion table that associates a management number of the control function that is system common information, with dedicated information for each of the machines that corresponds to the management number;
   a data conversion unit that at least either converts the dedicated data for each of the machines into the common data in accordance with the dedicated information for each of the machine in the conversion table or converts the common data into the dedicated data for each of the machines in accordance with the system common information in the conversion table; and
   a common data management unit configured to store, in the common data storage unit, the common data generated by the data conversion unit and configured to transfer the common data stored in the common data storage unit to the data conversion unit.

2. The information processing apparatus according to claim 1, wherein the machining information includes at least one of a machining program, a configuration parameter, an offset value, tool information, and a ladder program.

3. The information processing apparatus according to claim 1, wherein the common data management unit is configured to be able to communicate with external equipment provided outside the information processing apparatus, and the common data management unit has a function of receiving, from the external equipment, a request for updating the common data stored in the common data storage unit and a request for transferring the common data stored in the common data storage unit to the external equipment or the data conversion unit.

* * * * *